(12) United States Patent
Kamimura

(10) Patent No.: US 8,678,681 B2
(45) Date of Patent: Mar. 25, 2014

(54) SHUTTER CONTROL DEVICE

(75) Inventor: Masayuki Kamimura, Tokyo (JP)

(73) Assignee: Pentax Ricoh Imaging Company, Ltd., Tokyo (JP)

(*) Notice: Subject to any disclaimer, the term of this patent is extended or adjusted under 35 U.S.C. 154(b) by 0 days.

(21) Appl. No.: 13/525,468

(22) Filed: Jun. 18, 2012

(65) Prior Publication Data

US 2013/0011130 A1 Jan. 10, 2013

(30) Foreign Application Priority Data

Jul. 8, 2011 (JP) ................... 2011-152160

(51) Int. Cl.
*G03B 9/08* (2006.01)
*G03B 7/00* (2006.01)
*G03B 17/00* (2006.01)
*H04N 5/235* (2006.01)
*G02B 7/02* (2006.01)
*G03B 7/097* (2006.01)
*G03B 17/14* (2006.01)
*H04N 5/225* (2006.01)

(52) U.S. Cl.
CPC *G03B 9/08* (2013.01); *G03B 7/097* (2013.01); *G03B 17/14* (2013.01); *H04N 5/2254* (2013.01); *H04N 5/2351* (2013.01)
USPC ........... 396/452; 396/213; 396/236; 396/529; 348/362; 359/827

(58) Field of Classification Search
USPC ......... 396/452, 213, 215, 224, 236, 529–533; 348/220.1, 221.1, 224.1, 362–366; 359/819, 827, 828
See application file for complete search history.

(56) References Cited

U.S. PATENT DOCUMENTS

2007/0147815 A1* 6/2007 Tanaka ............................. 396/56
2010/0053378 A1* 3/2010 Toyoda et al. ............ 348/240.99

FOREIGN PATENT DOCUMENTS

JP 2000-098449 A 4/2000

OTHER PUBLICATIONS

U.S. Appl. No. 13/529,100 to Masayuki Kamimura, filed Jun. 21, 2012.

* cited by examiner

*Primary Examiner* — Rochelle-Ann J Blackman
(74) *Attorney, Agent, or Firm* — Greenblum & Bernstein, P.L.C.

(57) ABSTRACT

A shutter control device performs photography by operating a shutter housed in a lens barrel, and comprises a communication port, a shutter control unit and a memory. The communication port transmits and receives signals between the camera body and the lens barrel. The shutter control unit is provided in the camera body to output a shutter control signal. The memory is provided in the lens barrel to store shutter delay information regarding a time delay from when the shutter control signal is input to the lens barrel until when the shutter is closed. The shutter control unit receives the shutter delay information from the lens barrel and transmits the shutter control signal to the lens barrel through the communication port, ahead of an exposure time as determined by photometry, by an amount of time equal to the time delay.

13 Claims, 12 Drawing Sheets

FIG.4
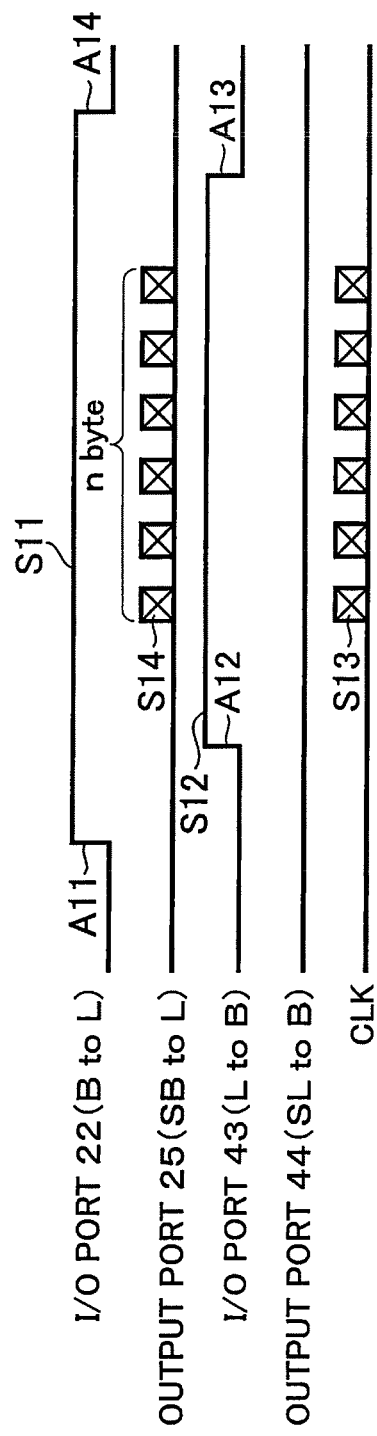
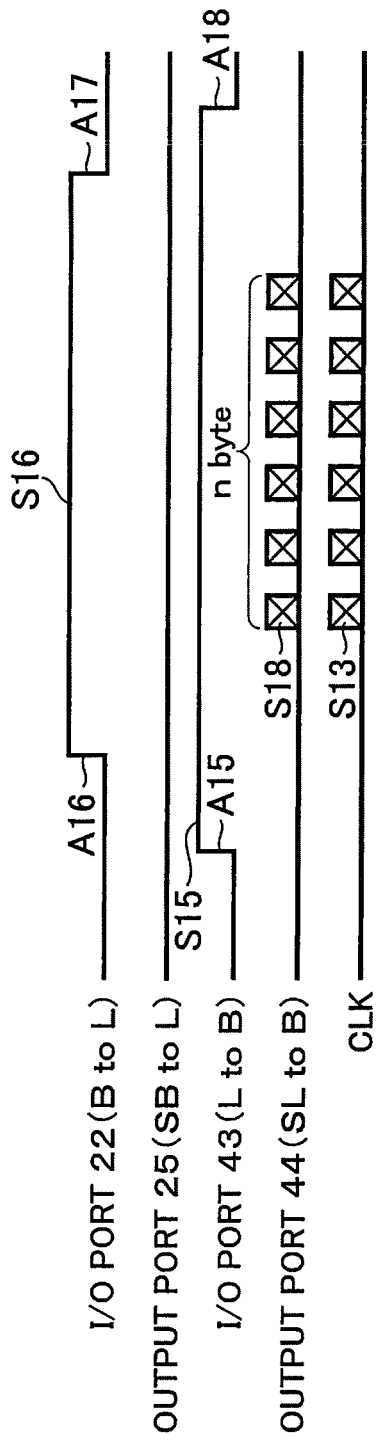

FIG.10

| AV VALUE | TIME DELAY($\mu$s) |
|---|---|
| 1(F1.4) | 100 |
| 2(F1.8) | 200 |
| 3(F2.0) | 300 |
| 4(F4.0) | 400 |
| 5(F5.6) | 500 |
| 6(F8.0) | 600 |

SHUTTER CONTROL DEVICE

BACKGROUND OF THE INVENTION

1. Field of the Invention

The present invention relates to a camera with interchangeable lenses, in which a shutter is provided in a lens barrel, and more particularly to a device for controlling an operation of the shutter.

2. Description of the Related Art

The responsiveness of an optical shutter is different depending upon the structure of the shutter, and a structure for preventing an excessive exposure, which is caused by the delay of a closing operation of the shutter, is conventionally known. For example, in Japanese Unexamined Patent Publication No. 2000-098449, it is disclosed that in an exposure control in which the exposure of the imaging device is started by an electronic shutter and is completed by an optical shutter, the timing of the start of the closing operation of the optical shutter is sped up in accordance with the speed of the closing operation.

In a camera with interchangeable lenses, in which a shutter is provided in a lens barrel, the shutter is different depending upon the lens barrel that is attached to the camera body, and thus the responsiveness of the shutter is different depending upon the lens barrel. Therefore, even if the camera body outputs a command to the lens barrel so that photography is carried out at the predetermined shutter speed, the actual shutter speed would be different depending upon the lens barrel. Especially at a high shutter speed, it would be difficult to control the shutter speed with a high degree of accuracy.

SUMMARY OF THE INVENTION

Therefore, an object of the present invention is to provide a shutter control device, which is provided in a camera with interchangeable lenses that has a shutter configured in a lens barrel, and can always control a shutter speed with a high degree of accuracy regardless of the lens barrel attached to the camera body.

According to the present invention there is provided a shutter control device that performs photography by operating a shutter housed in a lens barrel that is detachably attached to a camera body. The shutter control device comprises a communication port, a shutter control unit, and a memory. The communication port is provided for transmitting and receiving signals between the camera body and the lens barrel. The shutter control unit is provided in the camera body, and outputs a shutter control signal for operating the shutter. The memory is provided in the lens barrel to store shutter delay information regarding a time delay from when the shutter control signal is input to the lens barrel until when the shutter is closed. During photography the shutter control unit receives the shutter delay information or time delay information from the lens barrel and transmits the shutter control signal to the lens barrel through the communication port ahead of an exposure time, which is determined by photometry, by an amount of time equal to the time delay.

Further, according to the present invention there is provided a lens barrel detachably attached to a camera body. The lens barrel comprises a communication port, a shutter, and a memory. The communication port is provided for transmitting and receiving signals between the camera body and the lens barrel. The shutter is operated by a shutter control signal input from the camera body through the communication port. The memory stores shutter delay information including a time delay that extends from when the shutter control signal is input to the lens barrel until the shutter is closed.

Furthermore, according to the present invention there is provided a camera body to which a lens barrel is detachably attached, with a shutter being housed in the lens barrel. The camera body comprises a communication port and a shutter control unit. The communication port is provided for transmitting and receiving signals between the camera body and the lens barrel. The shutter control unit outputs a shutter control signal for operating the shutter. During photography the shutter control unit receives the shutter delay information or time delay information from the lens barrel and transmits the shutter control signal to the lens barrel through the communication port ahead of an exposure time, which is determined by photometry, by an amount of time equal to the time delay.

Further, according to the present invention there is provided a camera system in which a lens barrel is detachably attached to a camera body. The camera system comprises a shutter, a first communication port, a memory, a second communication port, and a shutter control unit. The shutter is housed in the lens barrel. The first communication port is provided in the lens barrel to transmit and receive signals between the camera body and the lens barrel. The memory is provided in the lens barrel to store shutter delay information regarding a time delay from when the shutter control signal is input to the lens barrel until when the shutter is closed. The second communication port is provided in the camera body to transmit and receive signals between the camera body and the lens barrel. The shutter control unit is provided in the camera body to output the shutter control signal. During photography the shutter control unit receives the shutter delay information or time delay information from the lens barrel, and transmits the shutter control signal to the lens barrel through the first and second communication ports ahead of an exposure time, which is determined by photometry, by an amount of time equal to the time delay.

BRIEF DESCRIPTION OF THE DRAWINGS

The object and advantages of the present invention will be better understood from the following description, with reference to the accompanying drawings in which:

FIG. 4 is a timing chart of a communication sequence between the camera body and the lens barrel;

FIG. 10 is a view showing an example of a shutter delay table;

DESCRIPTION OF THE PREFERRED EMBODIMENTS

A first embodiment of the present invention will be described below with reference to the drawings.

Figure 1:
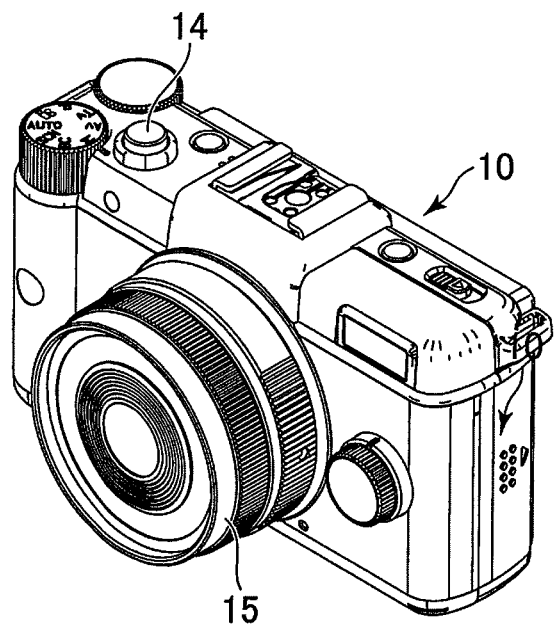
FIG. 1 is a perspective view of a camera with interchangeable lenses to which a first embodiment of the present invention is applied.
Figure 2:
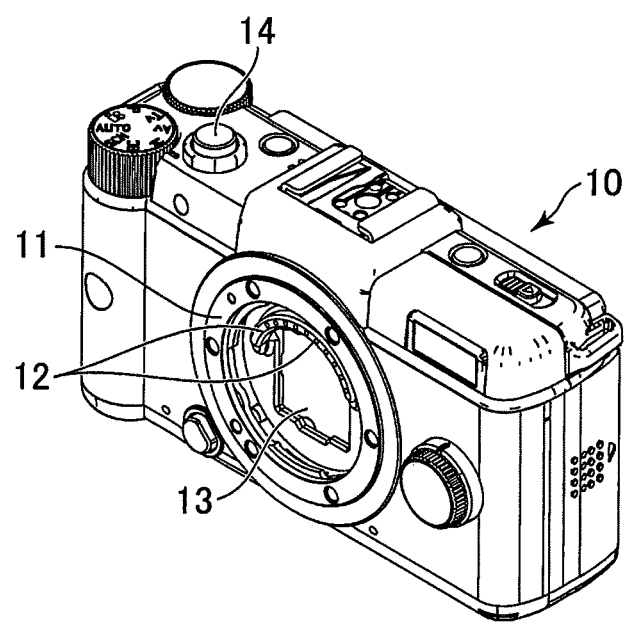
FIG. 2 is a perspective view of a camera body in which a lens barrel is removed from the camera shown in FIG. 1.

FIG. 1 shows an external appearance of a camera with an interchangeable lens, and FIG. 2 shows the camera without a lens barrel 15, which has been removed from its camera body 10. In this camera system the lens barrel 15 is detachably attached to the camera body 10. A shutter is provided in the lens barrel 15, and a shutter operation is performed by a camera processor provided in the camera body 10, as described below. In this embodiment the shutter is usually open, and is closed by a shutter release.

A plurality of electrical contacts 12 are disposed in the form of an arch in the inside of a lens mount 11 of the camera body 10. An imaging device unit 13, in which an imaging device (not shown) is housed, is provided under the electrical contacts 12. When electrical power of the camera body 10 is turned on, moving images are obtained through the imaging device and can be displayed on a monitor (not shown) as a live view. A shutter button 14 is provided on an upper surface of the camera body 10. When the shutter button 14 is partly depressed an AF operation is carried out, and when the shutter button 14 is fully depressed the shutter is operated by a camera processor provided in the camera body 10, so that a still image is taken. Thus, photography is performed using the imaging device.

Figure 3:
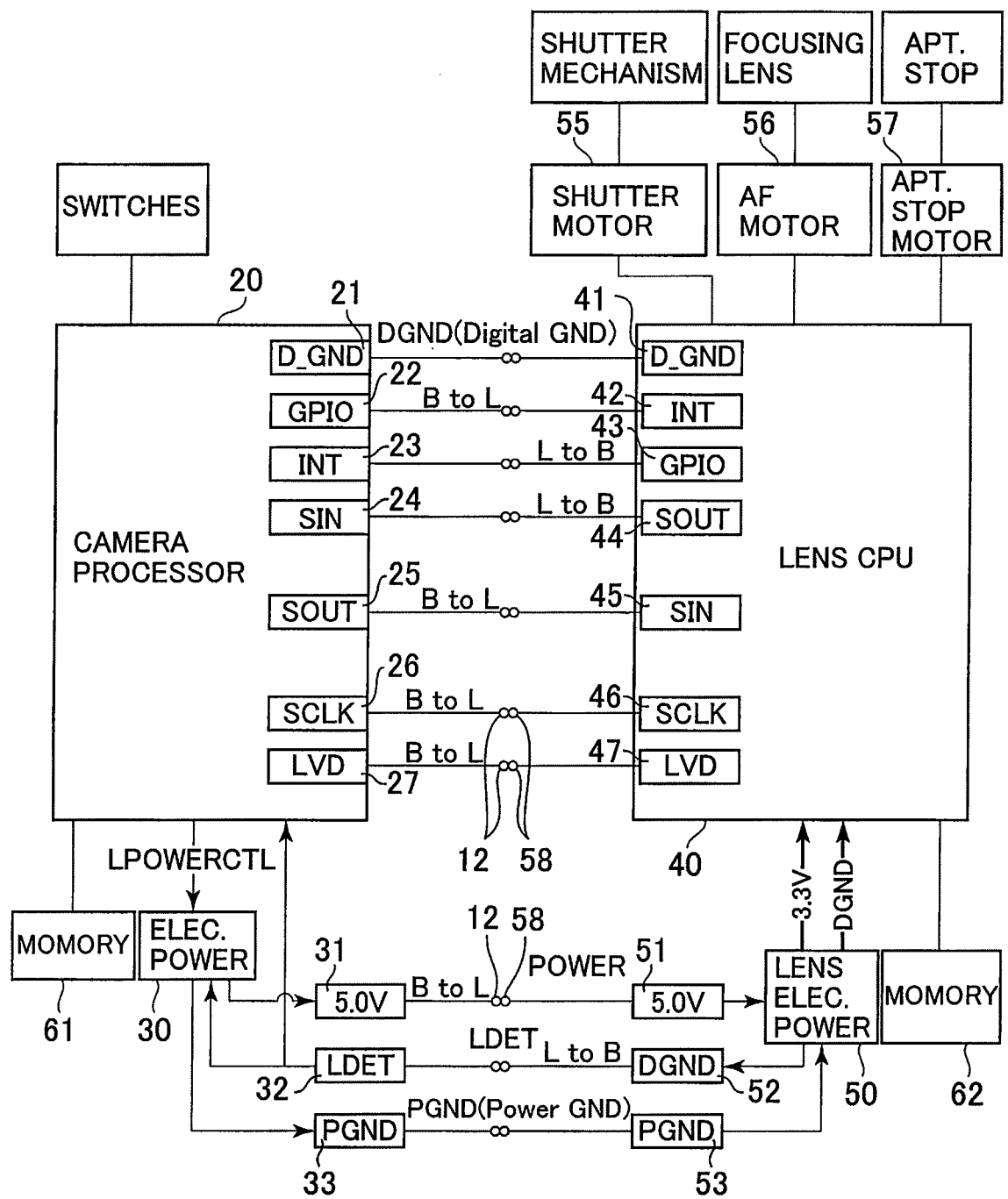
FIG. 3 is a block diagram showing an electrical structure of the camera body and the lens barrel.

With reference to FIG. 3, the electrical structure of the camera with interchangeable lenses is described below.

A camera processor 20 provided in the camera body 10 has communication ports such as a grounding port 21 for digital signals, an input/output port 22, an interruption port 23, a serial data input port 24, a serial data output port 25, a clock signal port 26, a vertical synchronizing signal port 27, and so on. The camera processor 20 is connected to the electrical power source 30, which is connected to an electrical power terminal 31, a sensing terminal 32, and a grounding terminal 33 for electrical power. Further, a memory 61 is connected to the camera processor 20 to store various information.

A lens CPU 40 provided in the lens barrel 15 has communication ports such as a grounding port 41 for digital signals, an interruption port 42, an input/output port 43, a serial data output port 44, a serial data input port 45, a clock signal port 46, a vertical synchronizing signal port 47, and so on. The lens CPU 40 is connected to a lens electric power source 50, which is connected to an electrical power terminal 51, a grounding terminal 52 for digital signals, and a grounding terminal 53 for electrical power. Further, the lens CPU 40 is connected to a shutter motor 55, an AF motor 56, and an aperture stop motor 57; and a memory 62 is connected to the lens CPU 40 to store various information of lenses.

When the lens barrel 15 is attached to the camera body 10, electrical contacts 58 of the lens barrel 15 come in contact with the electrical contacts 12 of the camera body 10. Thus, the sensing terminal 32 is electrically connected to the grounding terminal 52 for digital signals, and by so being grounded the camera processor 20 recognizes the mounting of the lens barrel 15 to the camera body 10. As a result, the camera processor 20 turns on the lens electric power 50 through the electrical power terminals 31 and 51, so that communication becomes possible between the camera body 10 and the lens barrel 15. That is, signals are transmitted and received through the communication ports between the camera body 10 and the lens barrel 15. For example, in accordance with a control of the camera processor 20, the AF motor 56 is driven to carry out an AF operation, the aperture stop motor 57 is driven to adjust an opening degree of the aperture stop, and the shutter motor 55 is driven to perform a photographing operation.

With reference to FIGS. 3 and 4, an example of a communication sequence between the camera body and the lens barrel is described below. First, the transmission of data from the camera processor 20 to the lens CPU 40 is described.

A communication request signal S11 is output from the camera processor 20 when the output level of the input/output port 22 is raised to "HIGH" (see A11), and input to the interruption port 42 of the lens CPU 40. By a change in the communication request signal S11 to "HIGH", the lens CPU 40 carries out a preparation process for communication, and then generates a "HIGH" communication admission signal S12. That is, the output level of the input/output port 43 is changed from "LOW" to "HIGH" (see A12) and the communication admission signal S12, which is "HIGH", is input to the interruption port 23 of the camera processor 20. Due to this, communication becomes possible between the camera processor 20 and the lens CPU 40. Thus, the communication request signal S11 and the communication admission signal S12 are handshake signals and the interruption ports 23 and 42 are handshake ports for receiving the handshake signals.

When the handshake is completed, the camera processor 20 and the lens CPU 40 can communicate with each other, at which time the camera processor 20 outputs a camera signal (serial data) S14 of n bytes, such as a command, through the output port 25 in synchronization with a serial clock signal S13 output from the clock signal port 26. The serial clock signal S13 is input to the clock signal port 46 of the lens CPU 40, and the camera signal S14 is input to the input port 45 of the lens CPU 40. When the input operation of the camera signal S14 is completed, the communication admission signal S12 is changed to "LOW". Namely, the output level of the input/output port 43 of the lens CPU 40 is changed from "HIGH" to "LOW" (see A13) and the communication admission signal S12, which is "LOW", is input to the interruption port 23 of the camera processor 20. By a change in the communication admission signal S12 to "LOW", the camera processor 20 changes the communication request signal S11 to "LOW". Namely, the output level of the input/output port 22 of the camera processor 20 is changed from "HIGH" to "LOW" (see A14), so that the communication admission signal S11, which is "LOW", is input to the interruption port 42 of the lens CPU 40, to complete the data transmission from the camera processor 20 to the lens CPU 40.

Data transmission from the lens CPU 40 to the camera processor 20 is similar to the above-described operation. First, the output level of the input/output port 43 of the lens CPU 40 is changed from "LOW" to "HIGH" (see A15) so that the communication request signal S15 becomes "HIGH", and it is then input to the interruption port 23 of the camera processor 20. The camera processor 20 carries out a preparation process for communication, and then an output level of the input/output port 22 is changed from "LOW" to "HIGH" (see A16) and the communication admission signal S16 becomes "HIGH". The communication admission signal S16 is input to the interruption port 42 of the lens CPU 40, which enables a communication between the lens CPU 40 and the camera processor 20.

Then, the lens CPU 40 outputs a lens signal (serial data) S18 of n bytes through the output port 44 in synchronization with a serial clock signal S13 output from the clock signal port 26 of the camera processor 20, and is input to the input port 24 of the camera processor 20. When the input operation of the lens signal S18 is completed, the communication admission signal S16 is changed to "LOW". Namely, the output level of the input/output port 22 of the camera processor 20 is changed from "HIGH" to "LOW" (see A17), and the communication admission signal S16, which is "LOW", is input to the interruption port 42 of the lens CPU 40. When the communication admission signal S16 becomes "LOW", the output level of the input/output port 43 of the lens CPU 40 is changed from "HIGH" to "LOW" (see A18). That is, the communication request signal S15 becomes "LOW" and the data transmission from the lens CPU 40 to the camera processor 20 is completed.

Note that, regarding the communication ports shown in FIG. 3, the grounding ports 21 and 41 are provided for grounding digital signals, and the vertical synchronizing signal ports 27 and 47 are provided for transmitting vertical synchronizing signals from the camera processor 20 to lens CPU 40 at every frame, i.e., 1/60 second.

As described above, data transmission and reception are carried out between the camera processor 20 and the lens CPU 40 during one frame. For example, when a command (camera signal S14) to request the current lens condition is transmitted from the camera processor 20 to the lens CPU 40, data (lens signal S18) such as lens performance information is transmitted to the camera processor 20. Such data transmission and reception are periodically performed when the electrical power 30 of the camera body 10 is turned on and the shutter button 14 is not depressed, while at the same time a moving image obtained through the imaging device is displayed as a live view on a monitor of the camera body 10.

When the shutter button 14 is depressed, the communication sequence is carried out basically in the same manner as described above in which the shutter button 14 is not depressed. That is, when the shutter button 14 is partly depressed, an AF operation is performed. Thus, a command (camera signal S14) of the AF operation is output from the camera processor 20, so that the lens starts to move toward the focusing position, and information (lens signal S18) such as the lens position is transmitted from the lens CPU 40 to the camera processor 20. In the camera processor 20, the focusing condition is detected using a contrast calculation based on an image obtained by the imaging device. Thus, when the focusing condition has not been attained, a command, by which the lens is adjusted, is output; and when the focusing condition is attained, a command, by which the lens is stopped, is output.

Figure 5:
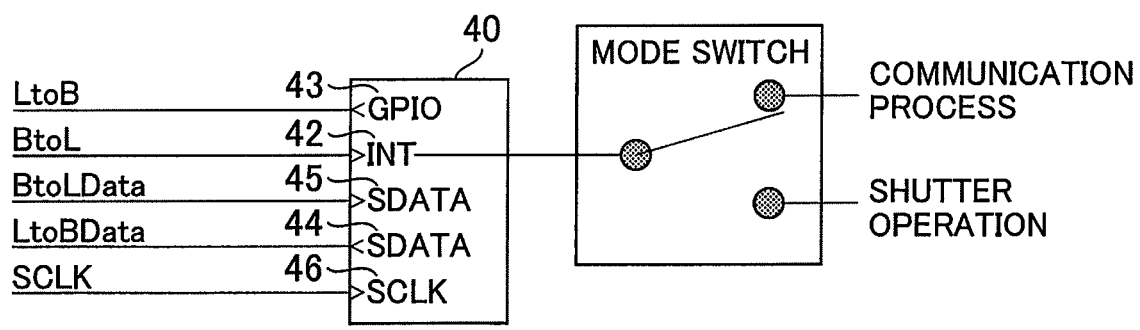
FIG. 5 is a view generally showing a change of operation mode of an interruption port of a camera CPU.

When the shutter is fully depressed, a photographing operation for a still image is carried out using the communication ports. The usage of the communication ports is described below, with reference to FIG. 5. A mode switch shown in FIG. 5 is a software switch, and is changed between a communication process mode and a shutter operation mode. The mode switch is usually set to the communication process mode, and is changed to the shutter operation mode when a shutter operation command (camera signal S14) is output from the camera processor 20.

In the communication process mode, the communication request signal S11 or the communication admission signal S16 output from the camera processor 20 is input to the interruption port 42. Conversely, in the shutter operation mode, a shutter control signal output from the camera processor 20 is input to the interruption port 42. Thus, the communication request signal S11, the communication admission signal S16, and the shutter control signal are transmitted from the camera body 20 to the lens CPU 40 through the same communication line, and are electrically identical, even though different processes are carried out in the lens CPU 40 depending upon the mode.

The reason why the interruption port 42 is used to input the shutter control signal to the lens CPU 40 is that the interruption port 42 is configured to perform the requested process in the lens CPU 40 immediately in response to the control signal, even while another process is being carried out in the lens CPU 40. That is, the interruption port 42 is suitable for inputting a time-critical control signal, such as the shutter control signal. Therefore, in the embodiment, the interruption port 42 is used not only as a handshake port, but also for inputting the shutter control signal to the lens CPU 40.

With reference to FIGS. 6-11, a control for a photographing operation is described below. Note that, in FIG. 6, one portion enclosed by a broken line C1 corresponds to the communication sequence of "DATA TRANSMISSION FROM CAMERA BODY TO LENS" in FIG. 4, and another portion enclosed by a broken line C2 corresponds to the communication sequence of "DATA TRANSMISSION FROM LENS TO CAMERA BODY" in FIG. 4.

In Step 101, a lens initialization routine described later is performed to initialize the lens for communication, so that various information can be transmitted from the lens barrel to the camera processor 20. In Step 102, a communication from the camera processor 20 to the lens CPU 40 is carried out. That is, the camera signal S14 is output to the lens CPU 40 in synchronization with the serial clock signal S13 while the communication request signal S11 and the communication admission signal S12 are "HIGH".

In Step 103, it is determined whether or not a shutter operation command is contained in the camera signal S14. When the shutter operation command is not included, a process corresponding to the camera signal S14 is carried out in Step 104. For example, when the shutter button is not depressed, data such as lens information (lens signal S18) is transmitted from the lens CPU 40 to the camera processor 20 because a command requesting the current lens condition is contained in the camera signal S14. When the shutter button 14 is partly depressed, information such as lens position and so on (lens signal S18) is transmitted from the lens CPU 40 to the camera processor 20 since a command for an AF operation is contained in the camera signal S14.

Figure 6:
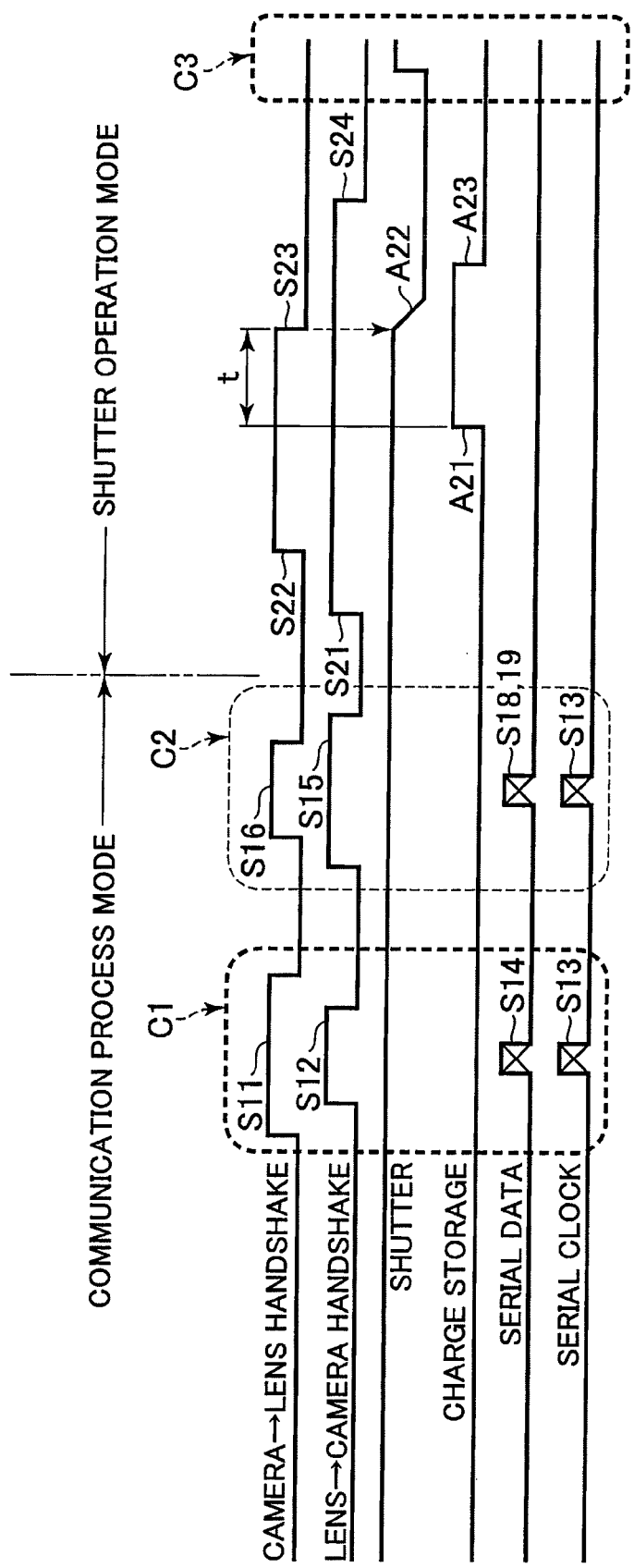
FIG. 6 is a timing chart for a shutter operation in accordance with the communication sequence.
Figure 7:
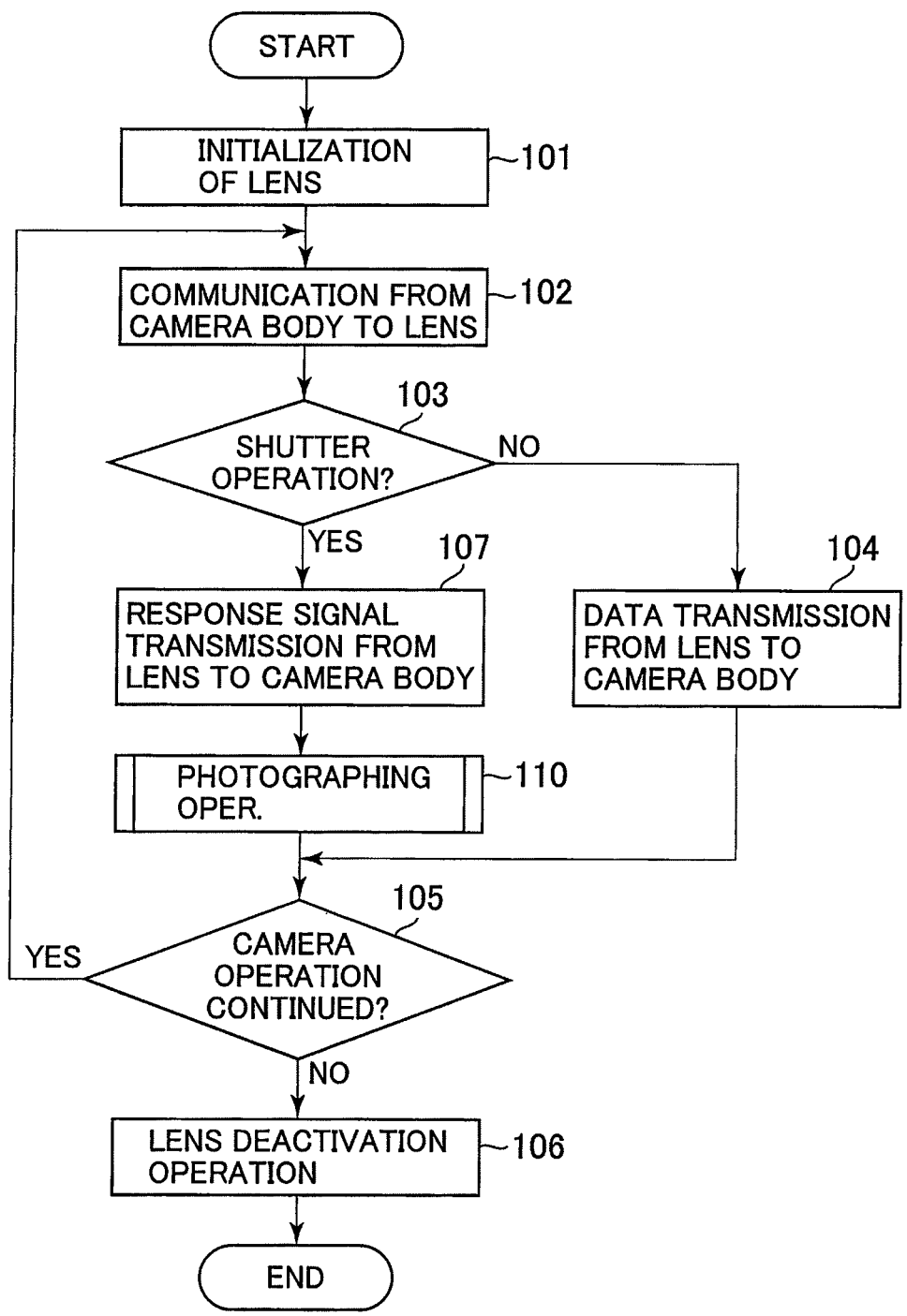
FIG. 7 is a flowchart showing the shutter operation in accordance with the communication sequence.

In Step 105, it is determined whether or not the camera operation is to be continued. When the electrical power of the camera body is turned on, the process goes back to Step 102, and the operations described above are repeated. Namely, the communication sequences enclosed by the broken lines C1 and C2 in FIG. 6 are carried out repeatedly. During the communication, if the electrical power of the camera body is turned off by the user, the process goes from Step 105 to Step 106, so that a predetermined lens deactivation operation is performed, and the communication sequence ends.

When the shutter button is fully depressed, the shutter operation command is contained in the camera signal S14. The shutter operation command informs the lens CPU 40 to prepare for a shutter release, i.e., to use the communication line connected to the interruption port 42 for transmitting the shutter control signal. In this case, the process goes from Step 103 to Step 107, so that a response signal S19, which is one byte indicating whether or not a shutter release is possible, is transmitted from the lens CPU 40 to the camera processor 20. When the shutter release is possible, the operation mode is changed from the communication process mode to the shutter operation mode (see FIG. 4), and a photographing operation routine is carried out in Step 120. Conversely, when the shutter release is not possible, the communication process mode is kept, and Step 120 is skipped and the process goes to Step 105.

The lens initialization routine and the photographing operation routine carried out in the camera processor 20 are described below. There is a delay in a closing operation of the shutter, and in addition to this, the responsiveness of the shutter is different depending on the particular shutter or lens barrel in use. In the lens initialization routine and the photographing operation routine, regardless of the lens barrel attached to the camera body, a process for controlling the shutter speed that is always high accurate is performed.

Figure 8:
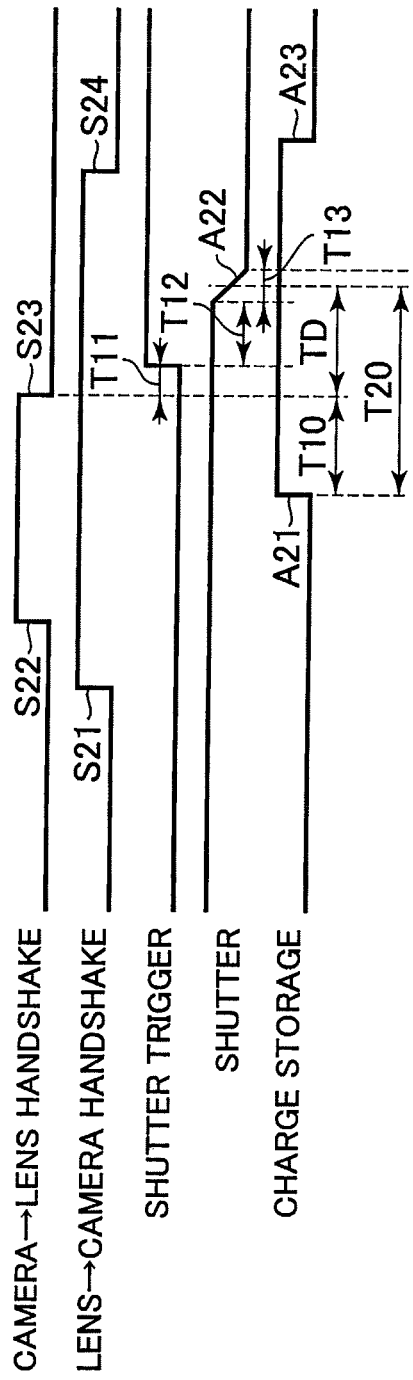
FIG. 8 is a timing chart for explaining a time delay of a closing operation of a shutter.
Figure 9:
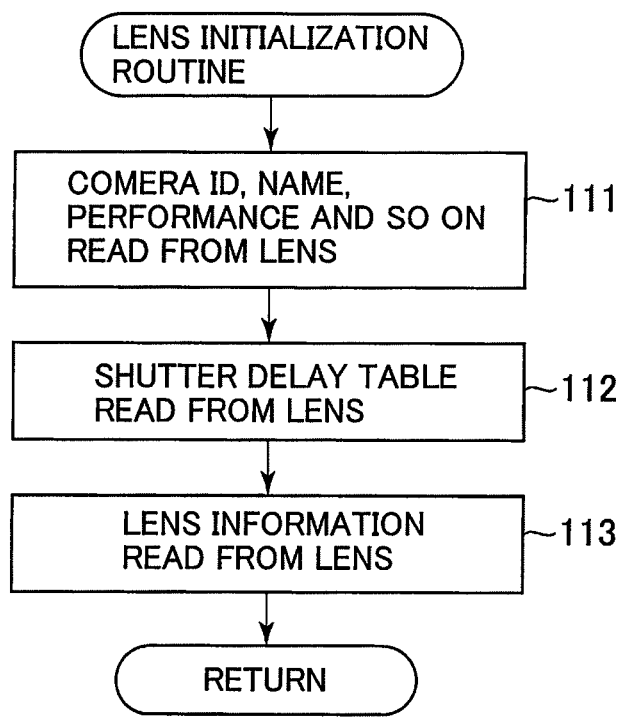
FIG. 9 is a flowchart for a lens initiation routine.
Figure 11:
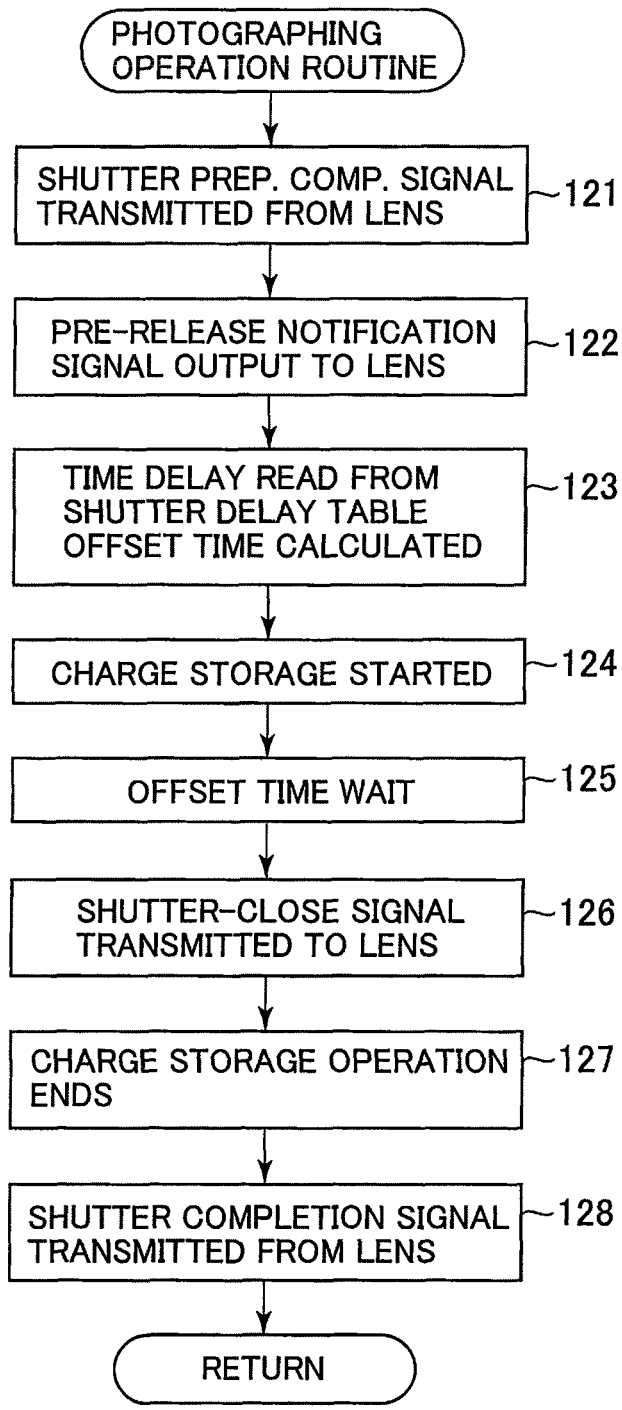
FIG. 11 is a flowchart for a photographing operation routine.

The time delay of a closing operation of the shutter is composed of an edge time delay T11, a shutter operation time delay T12, and a shutter operation time T13, as shown in FIG. 8. The edge time delay T11 is from when a shutter control signal S23, which will be described later, or an edge signal is input to the lens CPU 40 until when the electricity of the shutter motor 55 (see FIG. 3) is turned on, and is changed depending upon responsiveness of the lens CPU 40, the shutter operation circuit, and the software. The shutter operation time delay T12 is from when the electricity of the shutter motor 55 is turned on until when a closing operation of the shutter is started, and is changed depending on the structure of the shutter. The shutter operation time T13 is from when the closing operation of the shutter is started until when the shutter is completely closed, and is changed depending upon the structure of the shutter.

A length of time T20, in which the imaging device is exposed during photography, is determined by photometry, and is from when a charge storage is started (see A21) until when the shutter is closed, but in the shutter operation time T13, the opening degree of the shutter is gradually decreased (see A22). Thus, in the embodiment, half of the shutter operation time T13 is adopted as part of the time delay. Namely, a length of time from when the charge storage (see A21) is started until when the shutter control signal S23 is output is being described as an offset time T10, Exposure time=$T10+T11+T12+T13/2$ In other words, the time delay TD extends from when the shutter control signal S23 is input to the lens barrel 15 until when the shutter becomes halfway closed with respect to the opening degree in effect immediately before the input of the shutter control signal S23.

In the lens initialization routine, Step 111 is executed in which a lens ID, the name of the lens, performance characteristics of the lens and so on are read from the memory 62 of the lens barrel and stored in the memory 61 of the camera body 10. In Step 112, a shutter delay table stored in the memory 62 is read out and stored in the memory 61. The shutter delay table is a table (i.e., shutter delay information) composed of a plurality of aperture values and corresponding delay times. The shutter delay table is specific to the lens barrel, and an example of the shutter delay table is shown in FIG. 10. In Step 113, various lens information, which has not been readout in Steps 111 and 112, is read from the memory 62 and stored in the memory 61. Thus, the lens initialization routine ends.

In Step 121 of the photographing operation routine, a shutter preparation completion signal S21 is first transmitted from the lens CPU 40 to the camera processor 20. The shutter preparation completion signal S21 corresponds to the output level of the input/output port 43 of the lens CPU 40 that has been raised from "LOW" to "HIGH", and is output to the interruption port 23 of the camera processor 20. It is recognized in the camera processor 20 that preparations for a shutter release have been completed, in accordance with the shutter preparation completion signal S21. Thus, the output level of the input/output port 22 is raised from "LOW" to "HIGH", and this information is output to the interruption port 42 as a pre-release notification signal S22 in Step 112. In the lens CPU 40, it is recognized that a shutter release is approaching, due to the input of the pre-release notification signal S22.

In Step 123, a time delay corresponding to the aperture value (Av value) at that time is read from the shutter delay table (see FIG. 10) stored in the memory 61, and the offset time T10 (see FIG. 8) is calculated based on the time delay. Note that the aperture value has been determined by photometry, in the camera processor for example, before the photographing operation routine was executed. The aperture value is then transmitted to the lens CPU 40 in Step 102 of FIG. 7, so that the aperture stop motor 57 is driven to adjust the opening degree of the aperture stop in the lens barrel.

In Step 124, the Global Reset of the imaging device (CMOS) is carried out to sweep out any unnecessary electric charge, so that a charge storage operation can then be started in the imaging device (see A21). In Step 125, a timer is activated and the process waits until the offset time T10 has passed since the start of the charge storage operation. After the offset time T10 has passed, Step 126 is executed, in which the output level of the input/output port 22 of the camera processor 20 falls from "HIGH" to "LOW", and this information is output to the interruption port 42 of the lens CPU 40 as a shutter-close signal (or shutter control signal) S23.

Thus, in the lens barrel a shutter release is carried out, in which the shutter is closed (see A22). Then, in Step 127 the charge storage operation of the imaging device ends (see A23) and the process proceeds to Step 128, in which an output level of the input/output port 43 of the lens CPU 40 falls from "HIGH" to "LOW" and a shutter completion signal S24 indicating that the shutter operation has been completed is output to the interruption port 23 of the camera processor 20. Thus, the photographing operation routine ends, and the operation mode is changed from the shutter operation mode to the communication process mode.

As described above, since there is a delay in a closing operation of the shutter that is equal to the sum of edge time delay T11+shutter time delay T12+shutter operation time T13/2, the exposure time would be too long if the shutter closing signal is output exactly in accordance with the exposure time determined by photometry. In the photographing operation routine, however, a shutter release is carried out to properly by calculating the offset time T10 corresponding to the aperture value, using the shutter delay table specific to the lens barrel 15 attached to the camera body.

When the photographing operation routine ends, as described above, it is determined in Step 105 of FIG. 7 whether or not the camera operation is to be continued, and when the electric power of the camera body is turned on, the process returns to Step 102, so that the usual communication sequence is performed (see C3). In this communication sequence, a command (i.e., camera signal S14) for opening the shutter is output from the camera processor 20 to the lens CPU 40 (Step 102), so that the shutter is opened and information (i.e., lens signal S18) indicating the completion of the shutter opening is output from the lens CPU 40 (Step 104).

As described above, a specific communication line is not provided for transmitting the shutter control signal for a shutter release to the lens CPU 40 and instead the communication lines used for the usual lens communication are utilized. Therefore, it is not necessary to provide additional electrical contacts for a shutter operation, and thus, the electrical structure can be simplified and the manufacturing cost can be reduced. Further, since the shutter control signal is input to the interruption port 42 of the lens CPU 40, the shutter control signal always has priority before any other process performed in the lens CPU 40, and thus a high shutter speed operation, which cannot be performed in a usual communication, can be carried out.

Further, in the embodiment, the shutter delay table (or shutter delay information) composed of a plurality of aperture values and corresponding delay times is received from the lens barrel 15, and during photography the shutter control signal is transmitted to the lens barrel through the communication port ahead of an exposure time, which is determined by photometry, by an amount of time equal to the time delay. Therefore, in a camera with interchangeable lenses, in which a shutter is provided in a lens barrel, the shutter speed can always be controlled with a high accuracy regardless of the lens barrel attached to the camera body.

Next, a second embodiment is described.

The shutter delay table is read out in the lens initialization routine (Step 101 of FIG. 7) and a delay time is calculated for each photographing operation in the camera processor 20 in the first embodiment. Conversely, in the second embodiment, instead of storing the shutter delay table to the memory 61 of the camera body 10, the delay time data is transmitted directly from the lens CPU 40 to the camera processor 20. Namely, in the communication process mode the CPU 40 obtains the necessary time delay information by merely referring to the shutter delay table based on the aperture value output from the camera processor 20. The time delay information is then output to the camera processor 20 during photography. The other constructions are identical to those of the first embodiment.

Figure 12:
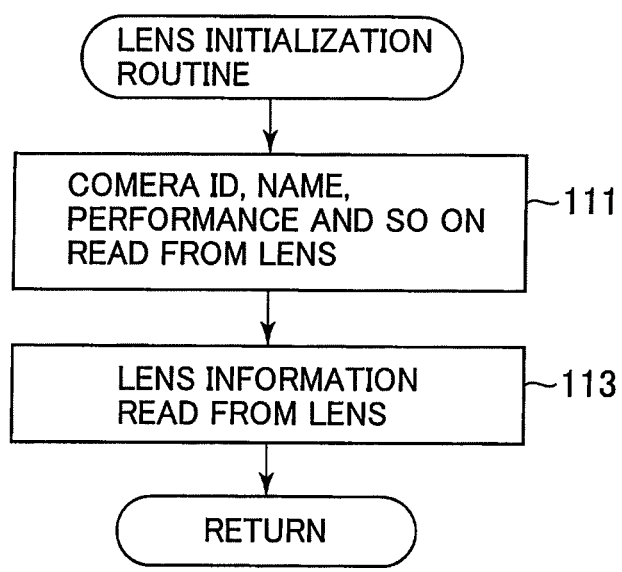
FIG. 12 is a flowchart for a lens initiation routine in a second embodiment.
Figure 13:
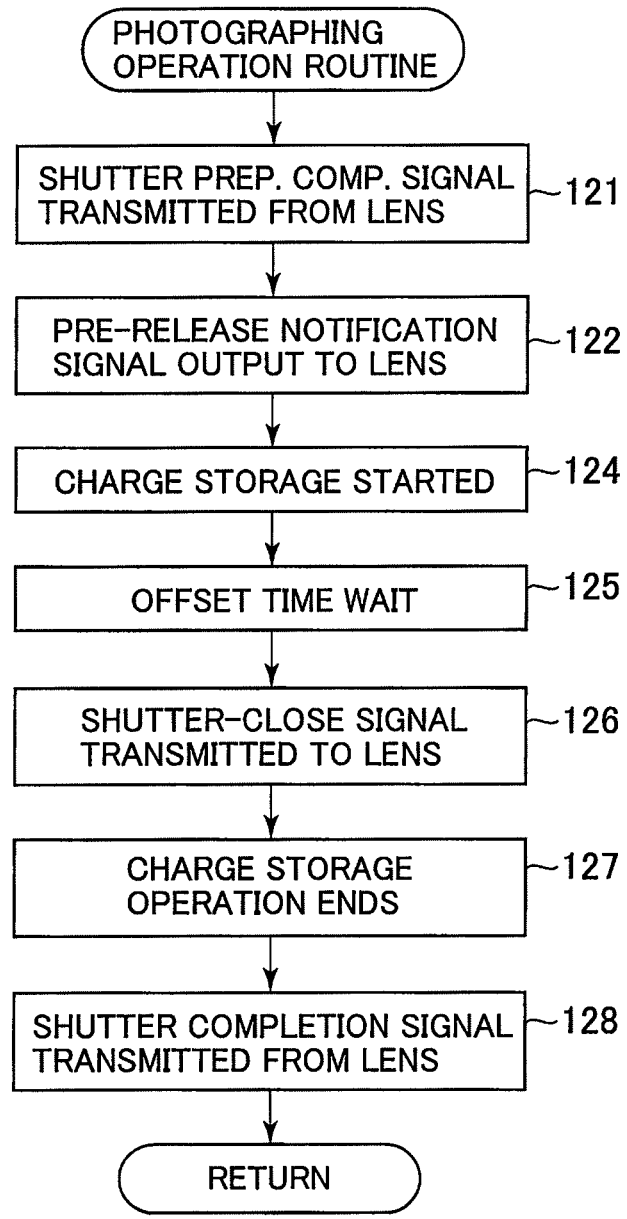
FIG. 13 is a flowchart for a photographing operation in the second embodiment.

FIG. 12 shows a flowchart for a lens initiation routine in the second embodiment. The difference from the first embodiment is that Step 112 has been deleted, and the other Steps are identical to those of the first embodiment. FIG. 13 shows a flowchart for a photographing operation in the second embodiment. The difference from the first embodiment is that Step 123 has been deleted, and the other Steps are identical to those of the first embodiment.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2011-152160 (filed on Jul. 8, 2011) which is expressly incorporated herein, by reference, in its entirety.

The invention claimed is:

1. A shutter control device that performs photography by operating a shutter housed in a lens barrel, which is detachably attached to a camera body, said shutter control device comprising:
    a communication port provided for transmitting and receiving signals between said camera body and said lens barrel;
    a shutter controller provided in said camera body, said shutter controller outputting a shutter control signal for operating said shutter;
    a memory provided in said lens barrel, said memory storing shutter delay information regarding a time delay from when said shutter control signal is input to said lens barrel until when said shutter is closed; and
    an exposure-initiation processor that starts a charge storage operation in an imaging device provided in said camera body, said shutter control signal comprising a shutter-close signal for closing said shutter;
    said shutter controller receiving said shutter delay information regarding the time delay from said lens barrel, and transmitting said shutter control signal to said lens barrel through said communication port during photography, before an exposure time, which is determined by photometry, by an amount of time equal to said time delay, wherein said time delay extends from when said shutter-close signal is input to said lens barrel until said shutter becomes halfway open with respect to an opening degree immediately before the input of said shutter-close signal, said time delay varies in accordance with an aperture value.

2. The shutter control device according to claim 1, wherein said shutter delay information comprises a table composed of a plurality of aperture values and delay times determined for each of said aperture values.

3. The shutter control device according to claim 1, wherein said communication port comprises a handshake port for transmitting a handshake signal from said camera body to said lens barrel, said shutter control signal being transmitted to said lens barrel through said handshake port.

4. The shutter control device according to claim 3, wherein said handshake port comprises an interruption port for transmitting an interruption signal from said camera body to said lens barrel.

5. A lens barrel detachably attached to a camera body, said lens barrel comprising:
    a communication port provided for transmitting and receiving signals between the camera body and said lens barrel;
    a shutter operated by a shutter control signal input from the camera body through said communication port, said shutter control signal comprising a shutter close signal for closing said shutter; and
    a memory storing shutter delay information including a time delay from when said shutter control signal is input to said lens barrel until said shutter is closed, wherein said time delay extends from when said shutter-close signal is input to said lens barrel until said shutter becomes halfway open with respect to an opening degree immediately before the input of said shutter-close signal, said time delay varies in accordance with an aperture value.

6. The lens barrel according to claim 5, wherein said shutter delay information comprises a table composed of a plurality of aperture values and delay times determined for each of said aperture values.

7. The lens barrel according to claim 5, wherein said communication port comprises a handshake port for transmitting a handshake signal from said camera body to said lens barrel, said shutter control signal being transmitted to said lens barrel through said handshake port.

8. A camera body to which a lens barrel is detachably attached, a shutter being housed in the lens barrel, said camera body comprising:
    a communication port provided for transmitting and receiving signals between said camera body and the lens barrel;
    a shutter controller outputting a shutter control signal for operating said shutter;
    an exposure-initiation processor that starts a charge storage operation in an imaging device provided in said camera body, said shutter control signal comprising a shutter-close signal for closing said shutter;

said shutter controller receiving shutter delay information regarding a time delay from the lens barrel, and transmitting said shutter control signal to the lens barrel through said communication port during photography, before an exposure time, which is determined by photometry, by an amount of time equal to said time delay, wherein said time delay extends from when a shutter-close signal is input to said lens barrel until said shutter becomes halfway open with respect to an opening degree immediately before the input of said shutter-close signal, said time delay varies in accordance with an aperture value.

9. The camera body according to claim 8, wherein said shutter delay information comprises a table composed of a plurality of aperture values and delay times determined for each of said aperture values.

10. The camera body according to claim 8, wherein said communication port comprises a handshake port for transmitting a handshake signal from said camera body to said lens barrel, said shutter control signal being transmitted to said lens barrel through said handshake port.

11. A camera system in which a lens barrel is detachably attached to a camera body, said camera system comprising:
- a shutter housed in said lens barrel;
- a first communication port provided in said lens barrel to transmit and receive signals between said camera body and said lens barrel;
- a memory provided in said lens barrel to store shutter delay information regarding a time delay from when said shutter control signal is input to said lens barrel until when said shutter is closed;
- a second communication port provided in said camera body to transmit and receive signals between said camera body and said lens barrel;
- a shutter controller provided in said camera body to output said shutter control signal; and
- an exposure-initiation processor that starts a charge storage operation in an imaging device provided in said camera body, said shutter control signal comprising a shutter-close signal for closing said shutter;
- said shutter controller receiving said shutter delay information regarding a time delay from said lens barrel, and transmitting said shutter control signal to said lens barrel through said first and second communication ports during photography, before an exposure time, which is determined by photometry, by an amount of time equal to said time delay, wherein said time delay extends from when a shutter-close signal is input to said lens barrel until said shutter becomes halfway open with respect to an opening degree immediately before the input of said shutter-close signal, said time delay varies in accordance with an aperture value.

12. The camera system according to claim 11, wherein said shutter delay information comprises a table composed of a plurality of aperture values and delay times determined for each of said aperture values.

13. The camera system according to claim 11, wherein said communication port comprises a handshake port for transmitting a handshake signal from said camera body to said lens barrel, said shutter control signal being transmitted to said lens barrel through said handshake port.

* * * * *